UNITED STATES PATENT OFFICE.

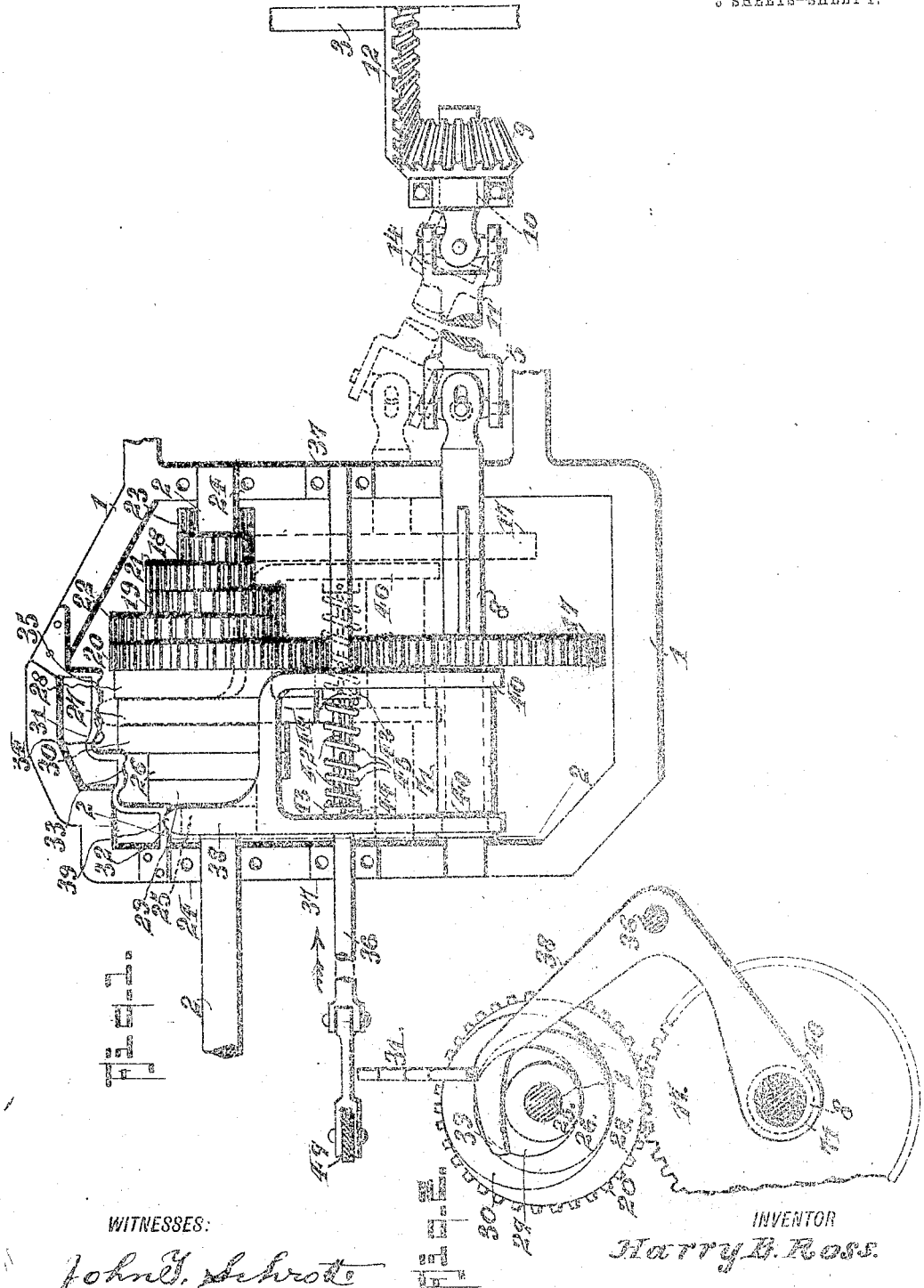

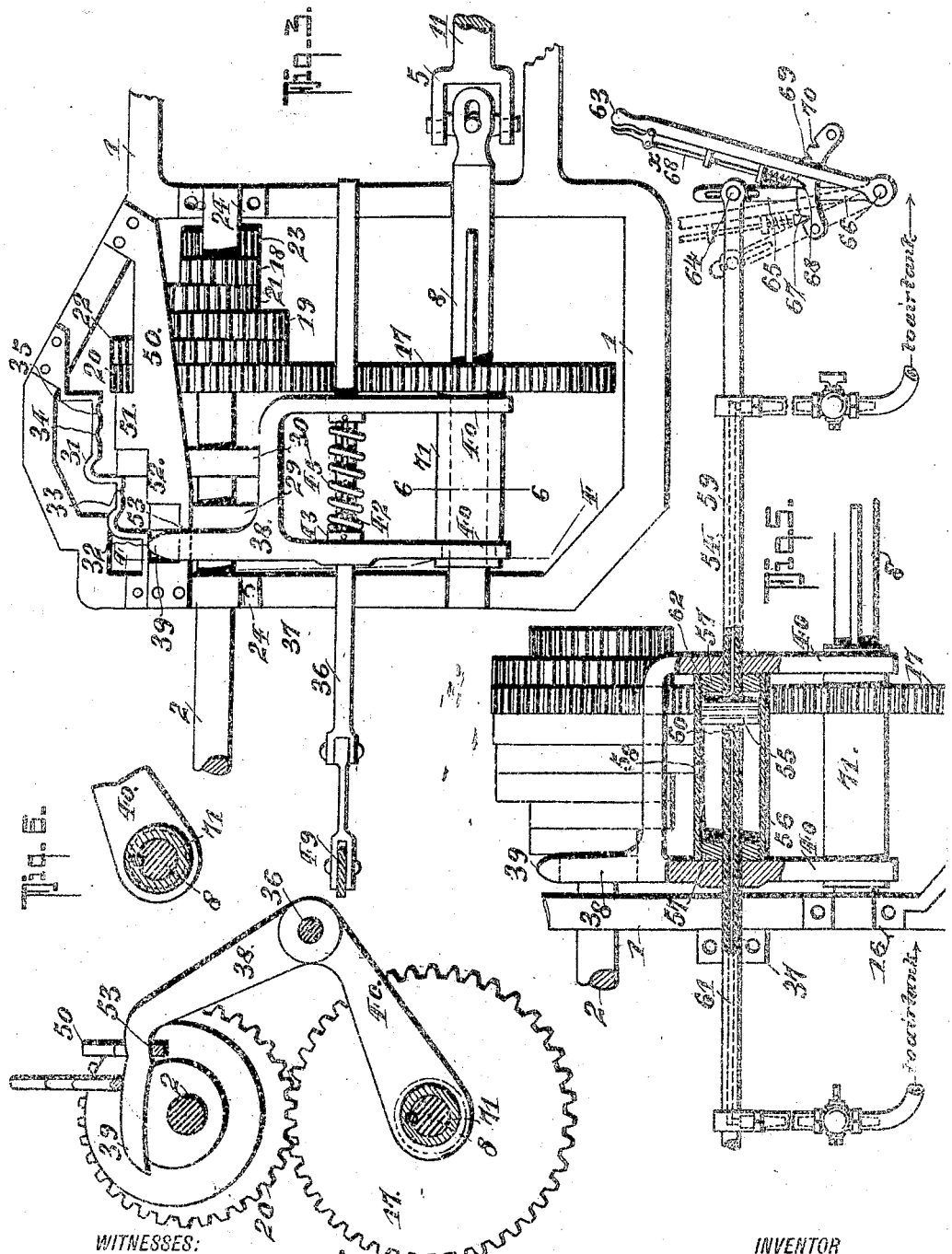

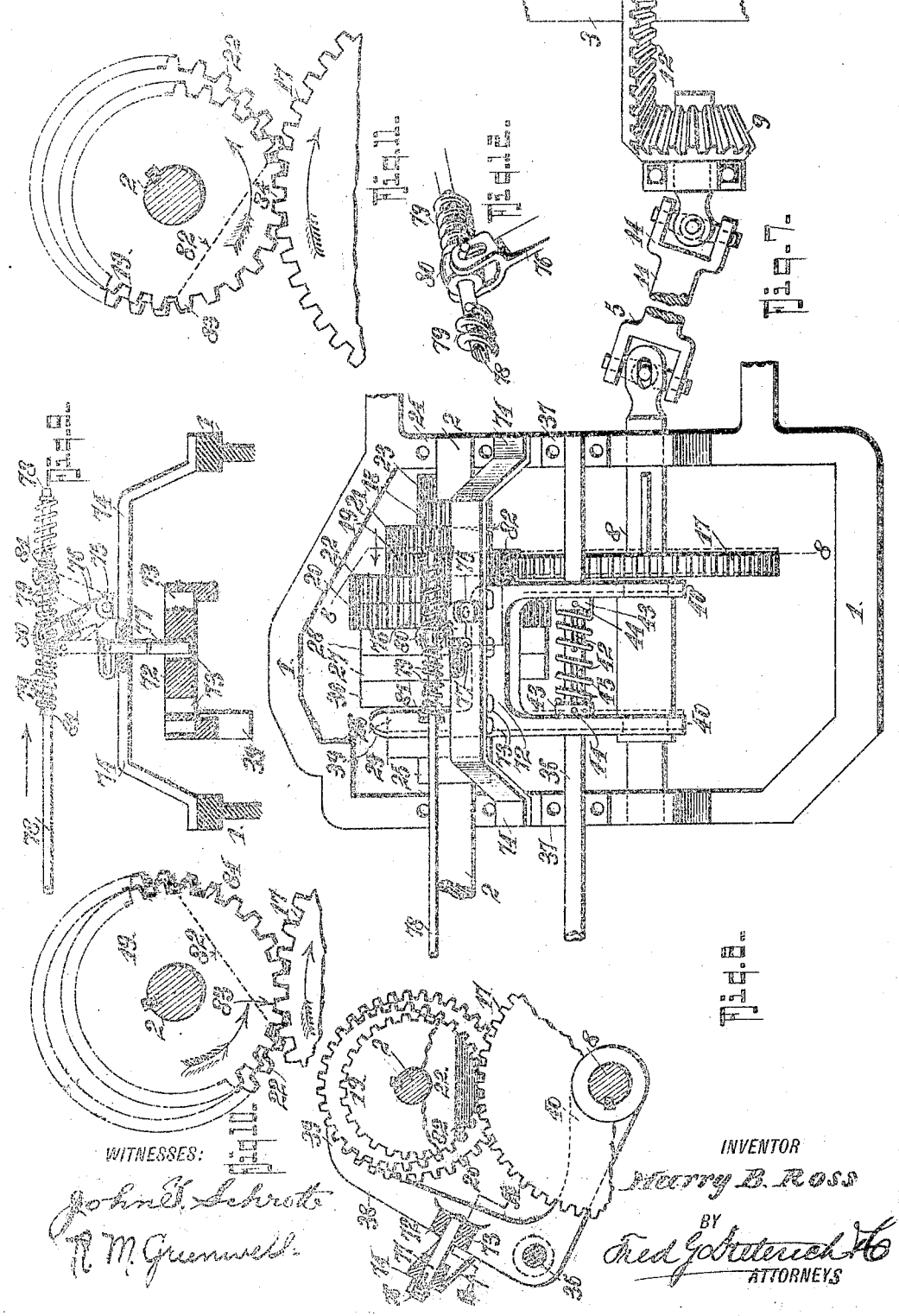

HARRY BEAUREGARD ROSS, OF DENVER, COLORADO, ASSIGNOR TO THE ROSS TRANSMISSION GEAR COMPANY, OF DENVER, COLORADO, A CORPORATION OF COLORADO.

TRANSMISSION MECHANISM.

1,070,538.

Specification of Letters Patent.  Patented Aug. 19, 1913.

Application filed May 17, 1912. Serial No. 697,862.

*To all whom it may concern:*

Be it known that I, HARRY B. ROSS, residing at Denver, in the county of Denver and State of Colorado, have invented certain new and useful Improvements in Transmission Mechanism, of which the following is a specification.

My invention relates to certain new and useful improvements on that type of transmission mechanisms disclosed in my Patent #1,028,078 issued on the 28 day of May, 1912, on an application filed May 12, 1911, Serial #626823. In the patent aforesaid there are provided a series of eccentric and concentric gears on the driving shaft with which a shiftable gear on a counter shaft meshes, the shifting gear being both laterally shiftable and shiftable in its own plane so as to enable its coöperation with the concentric and eccentric gears of various diameters. In that patent also an arm device was provided that was carried by the counter shaft and gear which was mounted to reciprocate and be operated by a set of concentric and eccentric disks on the driving shaft to hold the shiftable gear in mesh with the driving shaft gears at all times.

My present invention differentiates from what is disclosed in the patent referred to in this, that there is provided, in place of the shiftable arm, a bell crank lever which is laterally shiftable with the shiftable gear but not bodily shiftable with the shiftable gear when it moves in its own plane. The bell crank lever is coöperatively connected with the shiftable gear and with the devices which coöperate to hold the shiftable gear in mesh with the driving shaft gears.

My present invention further differentiates from the patent referred to, in the means which are provided for holding the bell crank lever in position to maintain the shiftable gear in mesh with the concentric gears, and it also differentiates from the patent aforesaid in providing a modified form of resilient device for effecting the shifting of the bell crank and shiftable gear laterally along the counter shaft to bring the shiftable gear into mesh with the various driving shaft gears.

The present invention also includes a special device coöperative with the bell crank lever for latching it in its various "change speed" positions.

In addition to the foregoing, the present invention also embodies those novel details of construction, combination and arrangement of parts, all of which will be first fully described, and then be specifically pointed out in the appended claims, reference being had to the accompanying drawings, in which:—

Figure 1 is a top plan view, parts being removed, illustrating the coöperative relation of the various parts of the invention. Fig. 2 is a detail section on the line 2—2 of Fig. 1 looking in the direction of the arrow. Fig. 3 is a view similar to Fig. 1 of a modification of the invention. Fig. 4 is a section on the line 4—4 of Fig. 3. Fig. 5 is a detail view largely diagrammatic, illustrating further modification of the invention, and Fig. 6 is a detail cross section on the line 6—6 of Fig. 3. Fig. 7 is a view similar to Fig. 1 of another form of the invention. Fig. 8 is a cross section on the line 8—8 of Fig. 7 taken in the direction of the arrow. Fig. 9 is a detail section on the line A—A of Fig. 8, looking in the direction of the arrow. Figs. 10 and 11 are detail views showing the action of the gears with relation to each other.

Referring now to the accompanying drawings, in which like numerals and letters of reference designate like parts in all the figures, 1 represents the transmission casing or frame, in suitable bearings 24 of which the driving shaft 2 is mounted in a relatively fixed location.

3 designates the driven shaft which carries a master gear 12, that continuously meshes with a pinion 9 on the transmission shaft 11, the shaft 11 having universal joints 5 and 14 to coöperate with the counter shaft 8, which is mounted in the bearing slots 16 in the frame 1. Mounted on the shaft 8 and keyed to turn with it, but slidable along it, is the shiftable gear 17 which is adapted to mesh with the series of concentric gears 18, 19 and 20 and the intervening eccentric gears 21 and 22, as may be desired. The gear 17 is also adapted to mesh with the reversing pinion 23. In addition to the gears on the driving shaft 2, a set of concentric disks 25, 26, 27 and 28, are provided with intervening eccentric disks 29 and 30 to coöperate with the mechanism that holds the gears 17 in mesh with the gears 18 to 23 inclusive.

All of the parts so far as described, may be of the same construction as the corresponding parts in my patent before referred to as indicated in Fig. 1 of the drawings, or the concentric disks 25, 26, 27 and 28 may be eliminated and their place taken by a fixed bar 50 hereinafter again referred to, and especially disclosed in Fig. 3 of the drawings.

In order to hold the bell crank lever 38 in contact with the disks 25 to 30 inclusive, a device 31 may be employed which has notches 32, 33, 34 and 35 to coöperate with the latching portion 39 of the bell crank lever 38. The bell crank lever 38 is pivoted on the shifting rod 36, which is relatively fixedly located and mounted in bearings 37. The lever 38 has a finger 39 to coöperate with the various disks 25 to 30 inclusive, and it has bifurcated arms 40, the ends of which are provided with openings to receive the sleeve 71, that is keyed to the shaft 8 and carries the gear 17. Between the bifurcations 40, the shifting rod 36, is slotted or grooved, as at 42, and provided with collars 43, which are shifted along the rod 36 within the limits of the slots 42, the collars 43 having pins 44 to enter the slots 42. Between the collars 44, the compression spring 45, is located and it is by means of this spring that the desired force is applied to shift the bell crank lever 38 laterally to "change speed."

The manner in which the form of my invention, shown in Figs. 1 and 2, operates, will be readily understood by those skilled in the art. Assume that the parts are positioned as shown in full lines of that figure, it will be the indirect high speed drive, and assume that it is desired to shift the gears to a lower speed, the operator imparts movement to the lever 49 to move the rod 36 in the direction of the arrow in Fig. 1, thereby moving the collar 43 at the left to compress the spring 45 and apply a force against the right hand fork of the lever 38 to tend to move the same from the position shown in full lines in Fig. 1 toward the position shown in dotted lines. As soon as the eccentric disk 29 has turned around sufficiently to enable the finger 39 to pass on to it, the spring 45 will move the lever 38 and gear 17 from left to right in Fig. 1 until the finger 39 is riding on the eccentric disk 29 and the gear 17 is in the plane of the eccentric gear 22. The eccentric disk 29 rocks the bell crank 38 to cause the gear 17 to follow the eccentric gear 22, during one-half revolution of the driving shaft 2 for as soon as the finger 39 is free to pass off the disk 29 onto the disk 26, the spring 45 will effect the required movement and bring the gear 17 into mesh with the gear 19. At this time also, the latching portion 39 of the bell crank 38 will rest in the recess 33 of the latch 31, and the spring 45 will be in its normal position with respect to the shifting rod 36 with the collars 43 at the outward limit of the slots 42. In shifting from lower speeds to higher speeds a reverse operation takes place.

It will be noted that the bell crank lever 38 does not shift bodily in its own plane, but merely rocks on the relatively fixedly located rod 36.

In place of the concentric disks 25, 26, 27, and 28, I may use a fixed bar 50 having portions 51, 52 and 53 to coöperate with the finger 39 and retain the bell crank lever 38 in its position, whereby the gear 17 will be in mesh with the running gears 18, 19, and 20, or the reversing pinion 23, as will be clearly understood by reference to Fig. 3 of the drawings.

In place of the spring 45 "air pressure" may be employed as will be understood by reference to Fig. 5 of the drawings. It will be noted by reference to this figure that the shifting rod 54 that corresponds to the rod 36 in Fig. 1, is provided with a piston 55 that works in a cylinder 56 which is located between the bifurcations 40 of the bell crank lever 38. The cylinder 56 is plugged at 57 to form an air tight connection, and it has a central air inlet port 58 as indicated. The rod 54 at each side of the piston 55, is also provided with ports 60 and 62 that register respectively with ducts 59 and 61. The shifting rod 54 is shifted by a hand lever 63, that is mounted on a suitable shaft 66 to which an arm 65 is connected, the arm 65 being connected at 64 to the shaft 54. A suitable latch 68 is provided in connection with the lever 63 that coöperates with latch notches 67, 68, 69 and 70 in an arc segment, as is clearly shown in Fig. 5 of the drawings.

When it is desired to shift the bell crank lever from one change speed position to another, the lever 63 is moved to the corresponding notch in the arc segment whereby to move the piston 55 to one end or the other of the cylinder 56 and then air or expansionable gases is let in ahead of it through a suitable valve 46, which pressure will move the bell crank accordingly from one position to the other, as soon as the finger 39 is released by the eccentric gear 29 or 30 as the case may be.

The form shown on Sheet 3 of the drawings in Fig. 7 et seq. differs from that shown in the preceding figures in that, the gears 21 and 22, and the eccentrics 29 and 30 are provided with bevel portions 82 for a purpose hereinafter explained. The bridge 72, of the member 38, is provided with a series of apertures or recesses 73, one for each speed. 74 designates a support which is secured to the frame of the gearing in any suitable way, and which carries a bell crank lever 76, that is pivoted at 75 and has a pin 77 connected to it. The pin 77 passes through a hole in the bridge support 74 and enters the holes 73 to lock the member 38—40 from shifting until the proper time. 78 designates a releasing rod which is provided with a pair of springs 79 that coöperate with the bell crank lever 76. The springs 79 abut washers 80 that slide freely on the rod 78, adjacent to the lever 76, and pins or cotters 81 are provided to hold the spring 79 to its minimum compression. The operation of shifting from one running position to another is essentially the same so far as the gears are concerned as in the other form of invention, the difference, however, residing in the following matter: The bevels 82 on the eccentric disks 29 and 30 and on the eccentric gears 21 and 22 allow the bell crank arm 38 and gears 17 a slight movement in the direction of the shift and at the place of shift, when the spring 45 has been compressed by a movement of the rod 36. Since the pin 77 is in the hole 73, the bell crank carrying gears 17 does not shift until the pin 77 is pulled free of the hole 73. A movement of the rod 78 in the direction of the arrow causes the spring 79 at the left of the bell crank lever 76, in Fig. 9, to compress, thereby applying a force tending to rock the bell crank lever 76 in a direction to release the pin 77. Now in virtue of the bevels 82, the gears 17 will move enough to bind the pin 77 in the hole 73, thus the pin 77 cannot be pulled out of the hole 73 by the compressed springs 79 and bell crank 76 to allow the gears 17 to shift onto an eccentric until the bevels have thrown the gears 17 and consequently the arms 38 back to a normal position on a true speed gear as 19, thus preventing a late shift of the gears 17 and member 38. By reference to Figs. 10 and 11, it will be seen that if the gear 17 is released to shift (if it is possible to pull the pin 77) at a point 83, then the gear 17 would have to shift onto the eccentric 22 in a short interval of time, as the tooth at 83 is the last tooth in alinement on the gear 19 with a tooth on the eccentric gear 22. On the other hand there are several teeth in alinement between the gears 19 and 22 for example, for the shift of the gears 17 to take place, provided the shift can be started at or before the tooth 84 is reached. The bevel 82 on the sides of the gear 22 is best indicated in Fig. 8 and when the gear 17 is pressed against this bevel, the pin 77 will bind so that it cannot be pulled, consequently no shift of the bell crank carrying gear 17 can take place unless the pin 77 has been pulled before the gear 17 or bell crank member 38—39 have reached their respective bevels.

From the foregoing description taken in connection with the accompanying drawings, it is believed the complete construction, operation and advantages of the invention will be apparent to those skilled in the art to which it appertains.

What I claim is:—

1. In a transmission gear mechanism, a driving shaft, a plurality of gears on said shaft, a second shaft, a gear on said second shaft and shiftable along the same to mesh with the various gears of the driving shaft, a bell crank shifting lever connected and shiftable with said shiftable gear, and means coöperative with said bell crank lever for holding said shiftable gear in mesh with said driving shaft gears.

2. In a transmission gear mechanism, a driving shaft, a plurality of gears of different diameters on said driving shaft, a second shaft, a gear shiftably mounted on said second shaft to be movable along the same, a shifting rod, a bell crank lever fulcrumed on said shifting rod and connectible with said shiftable gear to move bodily with the same, means for shifting said bell crank lever to shift said shiftable gear into the planes of said driving shaft gears respectively, and means coöperative with said bell crank lever for maintaining said shiftable gear in mesh with said driving shaft gears.

3. In a transmission gear mechanism, a driving shaft, a plurality of gears of different diameters on said driving shaft, a second shaft, a gear shiftably mounted on said second shaft to be movable along the same, a shifting rod, a bell crank lever fulcrumed on said shifting rod and connectible with said shiftable gear to move bodily with the same, means for shifting said bell crank lever to shift said shiftable gear into the planes of said driving shaft gears respectively, and means coöperative with said bell crank lever for maintaining said shiftable gear in mesh with said driving shaft gears, said driving shaft gears including alternately arranged concentric and eccentric gears, and said last named bell crank coöperating means including a device for holding said bell crank to maintain said shiftable gear in mesh with said concentric driving shaft gears, and also including means on said driving shaft for engaging said bell crank lever when said shiftable gear is in the planes of said eccentric gears to maintain said shiftable gear in mesh with said eccentric gears.

4. In a transmission gear mechanism, a driving shaft, a plurality of gears of different diameters on said driving shaft, a second shaft, a gear shiftably mounted on said second shaft to be movable along the same, a shifting rod, a bell crank lever fulcrumed on said shifting rod and connectible with said shiftable gear to move bodily with the same, means for shifting said bell crank lever to shift said shiftable gear into the planes of said driving shaft gears respectively, and means coöperative with said bell crank lever for maintaining said shiftable gear in mesh with said driving shaft gears, and a latching device to coöperate with said bell crank lever to latch the same in each running position.

5. In a transmission gear mechanism, a driving shaft, a plurality of gears of different diameters on said driving shaft, a second shaft, a gear shiftably mounted on said second shaft to be movable along the same, a shifting rod, a bell crank lever fulcrumed on said shifting rod and connectible with said shiftable gear to move bodily with the same, means for shifting said bell crank lever to shift said shiftable gear into the planes of said driving shaft gears respectively, and means coöperative with said bell crank lever for maintaining said shiftable gear in mesh with said driving shaft gears, said driving shaft gears including alternately arranged concentric and eccentric gears, and said last named bell crank coöperating means including a device for holding said bell crank to maintain said shiftable gear in mesh with said concentric driving shaft gears, and also including means on said driving shaft for engaging said bell crank lever when said shiftable gear is in the planes of said eccentric gears to maintain said shiftable gear in mesh with said eccentric gears, said eccentric gears having bevel portions on one face, said bell crank lever having a portion provided with a series of apertures, a stop pin loosely projectable into said apertures in turn, said bevel portions allowing of said pin to bind in said apertures, and means for withdrawing said pin when the binding pressure has been released.

6. In a transmission gear mechanism, a driving shaft, a plurality of gears of different diameters on said driving shaft, a second shaft, a gear shiftably mounted on said second shaft to be movable along the same, a shifting rod, a bell crank lever fulcrumed on said shifting rod and connectible with said shiftable gear to move bodily with the same, means for shifting said bell crank lever to shift said shiftable gear into the planes of said driving shaft gears respectively, and means coöperative with said bell crank lever for maintaining said shiftable gear in mesh with said driving shaft gears, said driving shaft gears including alternately arranged concentric and eccentric gears, and said last named bell crank coöperating means including a device for holding said bell crank to maintain said shiftable gear in mesh with said concentric driving shaft gears, and also including means on said driving shaft for engaging said bell crank lever when said shiftable gear is in the planes of said eccentric gears to maintain said shiftable gear in mesh with said eccentric gears, said eccentric gears having bevel portions on one face, said bell crank lever having a portion provided with a series of apertures, a stop pin loosely projectable into said apertures in turn, said bevel portions allowing of said pin to bind in said apertures, and means for withdrawing said pin when the binding pressure has been released, said last named means comprising a bell crank lever connected with said pin, and means for storing up a force tending to move said bell crank lever in a direction to release said pin, said force acting when the binding pressure on said pin is released.

7. In a transmission gear mechanism, a driving shaft, a plurality of gears of different diameters on said shaft, a set of eccentric gears on said shaft having bevel portions, a second shaft, a shiftable gear on said second shaft coöperating with said gears and said bevel portions, means for applying a shifting force to said shiftable gear, and a latch device for holding said shiftable gear in alinement with the respective eccentric gears, said latch device adapted to be held by frictional contact from release when said shiftable gear is shifted toward said bevel portion, said bevel portion adaptable to shift said shiftable gear back on said eccentric gear to release said latch device, and means for withdrawing said latch device from its latching position upon its release.

HARRY BEAUREGARD ROSS.

Witnesses:
N. E. METZLER,
Jos. H. BLOCK.